G. HARDING.
POSITION INDICATOR FOR ELEVATORS.
APPLICATION FILED DEC. 15, 1913.
1,135,014.  Patented Apr. 13, 1915.
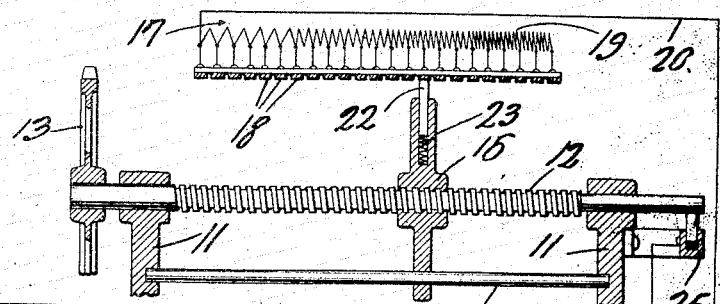
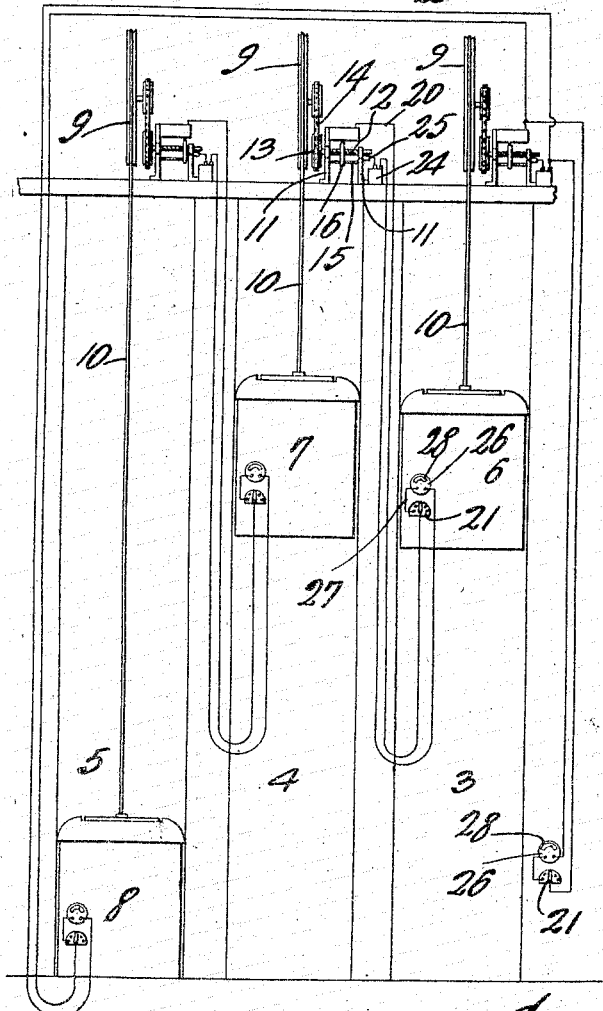
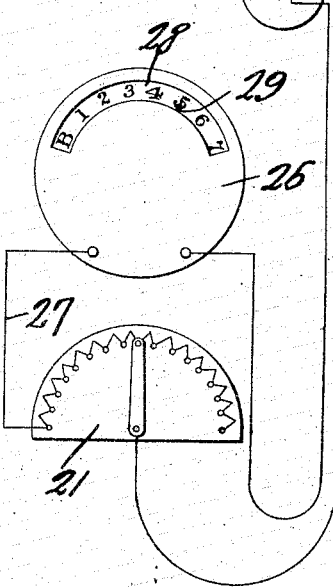
Witnesses
George Harding, Inventor
by C. A. Snow & Co., Attorneys

UNITED STATES PATENT OFFICE.

GEORGE HARDING, OF SPOKANE, WASHINGTON.

POSITION-INDICATOR FOR ELEVATORS.

1,135,014. Specification of Letters Patent. Patented Apr. 13, 1915.

Application filed December 15, 1913. Serial No. 806,863.

*To all whom it may concern:*

Be it known that I, GEORGE HARDING, a citizen of the United States, residing at Spokane, in the county of Spokane and State of Washington, have invented a new and useful Position-Indicator for Elevators, of which the following is a specification.

This invention relates to a position indicator for elevators.

It is an object of the present invention to provide an indicating system so that the operator of one elevator will be kept constantly informed as to the movements of the next adjacent car.

A further object is to provide an indicating system for elevators in which an indicating device is mounted in each car and indicates by means of a pointer moving over a graduated scale the exact movements of the next adjacent car.

A further object is to provide an indicator placed in an elevator car which includes a graduated scale over which moves a pointer, the rate of travel of the pointer indicating the speed as well as position of the next adjacent car so that the movements of the various cars may be properly controlled and synchronized.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a diagrammatic view of an elevator with three cars each of which is provided with my improved indicating apparatus, so that the position and rate of travel of the next adjacent car will be discernible by the operator of each car. Fig. 2 is a diagrammatic view of the electric apparatus involved and the mechanical means whereby the electric circuits are controlled.

Referring to the drawings in which similar reference numerals designate corresponding parts throughout the several views, 3, 4 and 5 represent elevator shafts in which the cars 6, 7 and 8 travel. Suitable elevator operating means are provided the major portion of which however does not concern the present application and of which the pulley wheels 9 and cables 10 alone are illustrated.

A pair of upright standards 11 support a lead screw 12 and which is rotated by the sprocket wheel 13 secured to one end and which is driven by a chain 14 which extends over a sprocket wheel carried by the pulley 9. A guide bar 15 extends parallel to the lead screw 12 and is rigidly secured to the posts or standards 11. A carriage 16 is mounted upon and threadedly engages the lead screw 12 and slidably engages the guide 15. Thus as the lead screw 12 is rotated through the intervention of the sprocket wheel 13 and chain 14, the carriage will move longitudinally along the lead screw and will be prevented from rotating therewith by the guide 15.

An electric resistance 17 is arranged in the path of movement of the carriage 16 and includes a plurality of contacts 18, each of which is connected to successive points along the resistance coil 19. A wire 20 is electrically connected to one end of the resistance coil 19 and is connected at its remote end to an adjusting resistance 21. The carriage is provided with the contacting member 22 which is resiliently held against the contacts 18 by the coiled spring 23. Thus as the lead screw is rotated the carriage will move the contact member 22 across and into successive electrical connection with the various contacts 18, thus varying the amount of resistance interposed between the wire 20 and the carriage 16.

A source of electrical energy 24 is electrically connected to the lead screw 12 by the brush or electric contact member 25. An electrical indicating device 26 is electrically connected to the batteries or source of electric energy 24 and is also in circuit with the adjustable resistance 21, being electically connected thereto by the wire 27. The indicator 26 is in the nature of an electric galvanometer of high resistance and is provided with a graduated scale 28, the indications of which designate the successive floors through which the elevator shafts extend. A pointer 29 moves across the graduated scale and is controlled in its movements by the constants and variables of the electric circuit. Each car is equipped with one of the indicators 26 and which is in an electric circuit controlled by the movements of the next adjacent car. Thus the car 6 is provided with an indicator electrically connected to the resistance of the traveling carriage directly above and controlled by the movements of the car 7. Thus the indicator in the car 6 will denote the position of the car 7 and in like manner the indicator in the car 7 will denote the position of the car 8. In like manner each car will be provided with an indicator denoting the position of the next adjacent car whereas as the last car 8 will be provided with an indicator denoting the position of the first car 6. As a car travels within the elevator shaft, the pulley wheel 9 will be rotated, causing a corresponding and proportional rotation of the lead screw 12 and which will determine the position of the carriage 16. The position of the carriage 16 determines the amount of the resistance coil 19 which will be in the electric circuit including the source of electric energy 24 and indicator 26. Thus the indications will be proportional to and functional of the position of the carriages 26 and therefore the positions of the elevator cars. In order that the indicator 26 may be adjusted from time to time to agree with variations in the source of electric energy, the adjusting resistance 21 is provided and by means of which the indicator may be adjusted to properly denote the position of the car. The adjusting resistance having once been set is locked in its adjusted position.

With the apparatus herein described, the operator will be conversant with the position and rate of travel of the next adjacent cars so that the cars may be properly timed and synchronized in their movements. Mention is also made of the fact that if it be so desired, indicators connected in parallel with the car indicators can be arranged and positioned upon each floor so that the position of the cars may be determined by people located upon the different floors.

As illustrating the foregoing statement, the indicator 28 is in electrical circuit with the indicator upon the car 8 to which it is connected in parallel so that the indicator 28 will register the position and rate of travel of the car 6.

Having thus fully described my invention, what I claim is:—

The combination with an elevator car, a hoisting cable, and a pulley wheel over which the cable runs; of an indicating circuit including a galvanometer graduated to indicate the altitude of the elevator car, a rheostat, and a resistance having a series of contacts cut in at various points thereof; and a controller coöperable with the resistance and embodying a screw operatively connected to the pulley wheel, a nut carried by the screw, and a contact carried by the nut and interposed in the said circuit, the last mentioned contact being movable along the said series of contacts.

In testimony that I claim the foregoing as my own, I have hereto affixed my signature in the the presence of two witnesses.

GEORGE HARDING.

Witnesses:
M. L. MOE,
L. K. SNYDER.